(12) United States Patent
Tabbara (10) Patent No.: US 7,379,982 B2
(45) Date of Patent: May 27, 2008

(54) SYSTEM AND METHOD FOR CUSTOM INSTALLATION OF AN OPERATING SYSTEM ON A REMOTE CLIENT

(76) Inventor: Bassam Tabbara, 4119 Baker Ave., NW., Seattle, WA (US) 98107

( * ) Notice: Subject to any disclaimer, the term of this patent is extended or adjusted under 35 U.S.C. 154(b) by 771 days.

(21) Appl. No.: 10/401,978

(22) Filed: Mar. 28, 2003

(65) Prior Publication Data

US 2003/0195995 A1     Oct. 16, 2003

Related U.S. Application Data

(60) Provisional application No. 60/372,864, filed on Apr. 15, 2002.

(51) Int. Cl.
*G06F 15/177* (2006.01)
(52) U.S. Cl. ............... 709/220; 709/221; 717/168; 713/100; 713/150
(58) Field of Classification Search ........... 709/220, 709/221; 717/168; 713/100, 150
See application file for complete search history.

(56) References Cited

U.S. PATENT DOCUMENTS

| | | | |
|---|---|---|---|
| 5,325,532 A | | 6/1994 | Crosswy et al. |
| 6,080,207 A | | 6/2000 | Kroening et al. |
| 6,209,089 B1 | | 3/2001 | Selitrennikoff et al. |
| 6,466,972 B1 | * | 10/2002 | Paul et al. ............ 709/222 |
| 6,854,009 B1 | * | 2/2005 | Hughes .............. 709/220 |
| 2002/0157089 A1 | * | 10/2002 | Patel et al. ........... 717/178 |
| 2002/0161868 A1 | * | 10/2002 | Paul et al. ............ 709/221 |
| 2003/0005037 A1 | * | 1/2003 | Aija et al. ............ 709/203 |
| 2003/0055919 A1 | * | 3/2003 | Fong et al. ............ 709/220 |

FOREIGN PATENT DOCUMENTS

| | | |
|---|---|---|
| GB | 2311390 | 9/1997 |
| WO | WO 99/63434 | 12/1999 |

OTHER PUBLICATIONS

European Search Report from European Patent Application No. EP03007901.6 dated Dec. 30, 2005.
Perry E. Scott, John S. Marvin, and Robert D. Quist, Boot Mechanism for Discless HP-UX, 1266 Hewlett-Packard Jounal, Oct. 1988, No. 5, Palo Alto, CA, U.S.A.
Nikkei Windows 2000, No. 44 (Nov. 2000 Issue), Nikkei Business Publications, Inc., Nov. 1, 2000, pp. 209-218 (Japan Patent Office CSDB Literature Number: Domestic Technical Magazine 2003-00103-020, ISSN: 1345-2835).
English translation of the Official Notice from Japanese Patent Office dated Dec. 21, 2007; Japanese Patent Application No. 2003-110879.

* cited by examiner

*Primary Examiner*—Saleh Najjar
*Assistant Examiner*—Thuong T Nguyen
(74) *Attorney, Agent, or Firm*—Shook, Hardy & Bacon, LLP (57) ABSTRACT

A platform for remotely installing an operating system on a client machine includes a builder engine, for instance running on a support server. The builder engine may interrogate a remote client, for instance a diskless thin client or a machine having a disk but malfunctioning, and receive a machine state image from that machine. The builder engine may then assemble a customized image or kernel of an operating system such as Microsoft Windows™ for transmission to the client. A file system may be initialized in electronic memory, or otherwise and the machine may commence operation, without having executed an operating system setup process. In embodiments, the client machine may then link to a complete image of an operating system to reinstall a comprehensive version of that system, or perform other tasks.

66 Claims, 5 Drawing Sheets

FIG. 1

```
//
// Device information
// define BM_DEVICE_TYPE_PCI       0x00000002
define BM_DEVICE_TYPE_PNP       0x00000003
define BM_DEVICE_TYPE_CARDBUS   0x00000004 typedef struct _DEVICE_INFO {
    UCHAR DeviceType;
    union {
        struct {
            USHORT VendorID;
            USHORT DeviceID;
            UCHAR BaseClass;
            UCHAR SubClass;
            UCHAR ProgIntf;
            UCHAR RevisionID;
            USHORT BusDevFunc;
            USHORT SubVendorID;
            USHORT SubDeviceID;
        } pci;
        struct {
            ULONG EISADevID;
            UCHAR BaseClass;
            UCHAR SubClass;
            UCHAR ProgIntf;
            UCHAR CardSelNum;
        } pnp;
    } info;
} DEVICE_INFO, * PDEVICE_INFO;

//
// BM Request / Response Packets.
// static const PCHAR GetBMRequestSignature = "\x81" "BMQ";

define BM_REQUEST_CLIENT_FLAG_ACPI   0x00000001
#define BM_REQUEST_CLIENT_FLAG_APIC   0x00000002
#define BM_REQUEST_CLIENT_FLAG_MP     0x00000004
#define BM_REQUEST_CLIENT_FLAG_PNP    0x00000008
define BM_REQUEST_CLIENT_FLAG_PCI    0x00000010 typedef struct _BM_REQUEST_PACKET {
    UCHAR Signature[4];              // "\x81" "BMQ";
    ULONG Length;

//
    // Information about the client
    //
    USHORT Version;                  // Version number
    USHORT Architecture;             // IA32, IA64 etc.
    ULONG  Flags;                    // BM_REQUEST_CLIENT_FLAG_*
    USHORT ProcessorCount;           // # of processors
    USHORT DeviceCount;              // # of devices
    USHORT DeviceOffset;
    USHORT PrimaryNicIndex;          // index of primary NIC
    USHORT PrimaryNicAddrLen;
    UCHAR  PrimaryNicAddr[16];       // Primary NIC MAC addr
    UCHAR  Data[1];                  // Device Information
} BM_REQUEST_PACKET, * PBM_REQUEST_PACKET;
```

FIG. 2.

```
HKEY_LOCAL_MACHINE
 System
  CurrentControlSet
   Services
    Binlbig
     Products
      {E597073D-BCA9-4935-8257-25530A5677D0}
         Architecture = REG_DWORD 0
         Startup = c:\bmonitor\binaries\startbm.com
         Loader = c:\bmonitor\binaries\osloader.exe
           CachePeriod = REG_DWORD 10
         BaseReg = "c:\bmonitor\binaries\bmreg.hiv"
         BootParams = "/FASTDETECT"
         BinaryDirs = REG_MULTI_SZ \
                     "c:\bmonitor\binaries"
         InfDirs = REG_MULTI_SZ \
                     "c:\bmonitor\binaries" \
                     "c:\bmonitor\binaries\entinf"
         Devices = REG_MULTI_SZ    \
                     "SYSTEM\BM_NET" \
                     "SYSTEM\BM_BMCP" \
                     "SYSTEM\BM_DISK"
         InfClasses = REG_MULTI_SZ   \
                     "NTBM" \
                     "SYSTEM" \
                     "NET" \
                     "HDC" \
                     "DISKDRIVE" \
                     "SCSIADAPTER"
```

*FIG. 3.*

```
static const PCHAR GetBMResponseSignature = "\x82" "BMS";

typedef struct _BM_RESPONSE_PACKET {
    UCHAR Signature[4];      // "\x82" "BMS"
    ULONG Length;
    ULONG Version;           // Version number
    ULONG Status;            // NTSTATUS error ULONG WaitTime;          // Wait time in secs
    ULONG TftpServerIp;      // TFTP server for download
    CHAR ImagePath[128];     // Image name and path

} BM_RESPONSE_PACKET, * PBM_RESPONSE_PACKET;
```

SYSTEM AND METHOD FOR CUSTOM INSTALLATION OF AN OPERATING SYSTEM ON A REMOTE CLIENT

CROSS REFERENCE TO RELATED APPLICATIONS

This application is related to, and claims priority from, U.S. Provisional Application Ser. No. 60/372,864 filed Apr. 15, 2002, which application is incorporated by reference.

FIELD OF THE INVENTION

The invention relates to the field of computing, and more particular to techniques for interrogating a remote client device to install a customized operating system, such as on a diskless or other computer.

BACKGROUND OF THE INVENTION

Computer networks of increasing size and complexity have resulted in corresponding challenges to network installation and maintenance. For instance, a company may deploy a large collection, from dozens to thousands or more, of personal computers or other client machines to support database, email or other services. Some of those machines may be thin network clients, lacking a hard drive or other mass storage medium. Others may contain a hard drive or other storage, but be prone to random hardware failures. In these cases and others, it may become difficult for a systems administrator or others to get a machine to boot into an operating system, such as the Microsoft Windows™ NT™, Windows™ 2000, Windows™ XP™ or other operating systems.

Remote installers designed to inject an operating system into a diskless or failed machine are commercially available. Those platforms typically transmit a small kernel of relatively primitive operating code, such as Microsoft DOS™, to a target machine to instigate file access and other operation. However, such platforms are not capable of installing a relatively comprehensive operating system, such as the aforementioned varieties of Microsoft Windows™, nor are they capable of detecting various types of installed hardware on the target machine, to customize the transmitted operating system accordingly. Other problems exist.

SUMMARY OF THE INVENTION

The invention overcoming these and other problems in the art relates in one regard to a system and method for custom installation of an operating system on a remote device, involving in one regard a support server equipped with a builder engine to interrogate and respond to a remote client machine to transmit an executable image of an operating system, for instance over a network. In embodiments, the builder engine may receive a machine state image from the remote client, indicating for instance the presence, absence or malfunction of a hard drive or other storage, available electronic memory and other resources. The builder engine may then assemble an appropriate image of an operating system, to transmit over the network to the client. The invention in this regard may thus generate a hardware-independent boot of the client device, which in embodiments may be carried out without a need for a separate setup phase for the operating system. In embodiments, the remote client may subsequently generate a local file system, for instance in electronic memory, under control of the operating system image. Once that and other necessary elements are installed and executing the client may perform operations such as running application software or performing other tasks. In embodiments, once the operating system image has been initiated on the remote client, the client may for instance link to another network resource, for instance to install a complete image of an operating system to replace the initial image, or to perform other tasks.

DETAILED DESCRIPTION OF EMBODIMENTS

Figure 1:
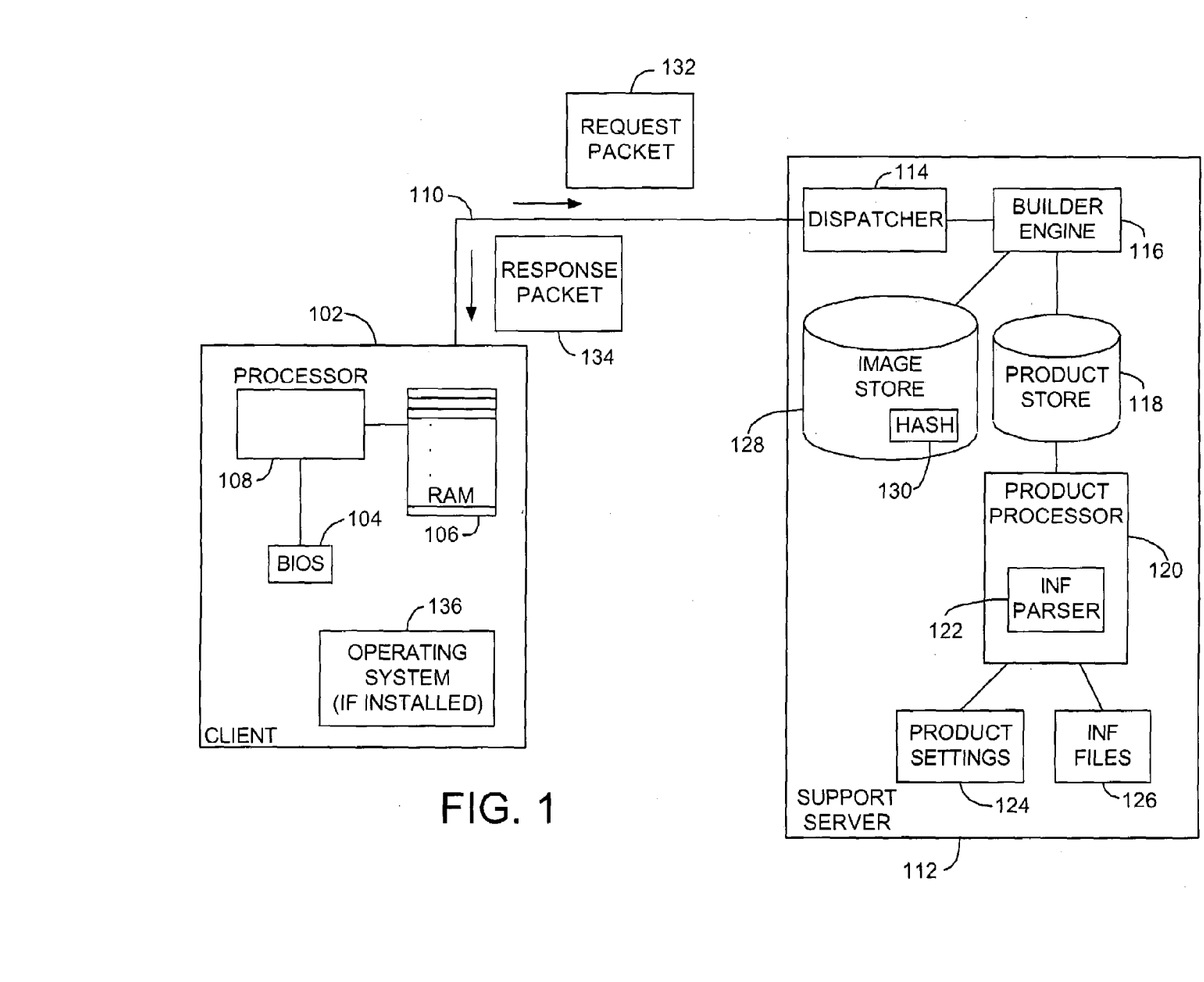
FIG. 1 illustrates an architecture in which an embodiment of the invention may operate.
Figure 2:
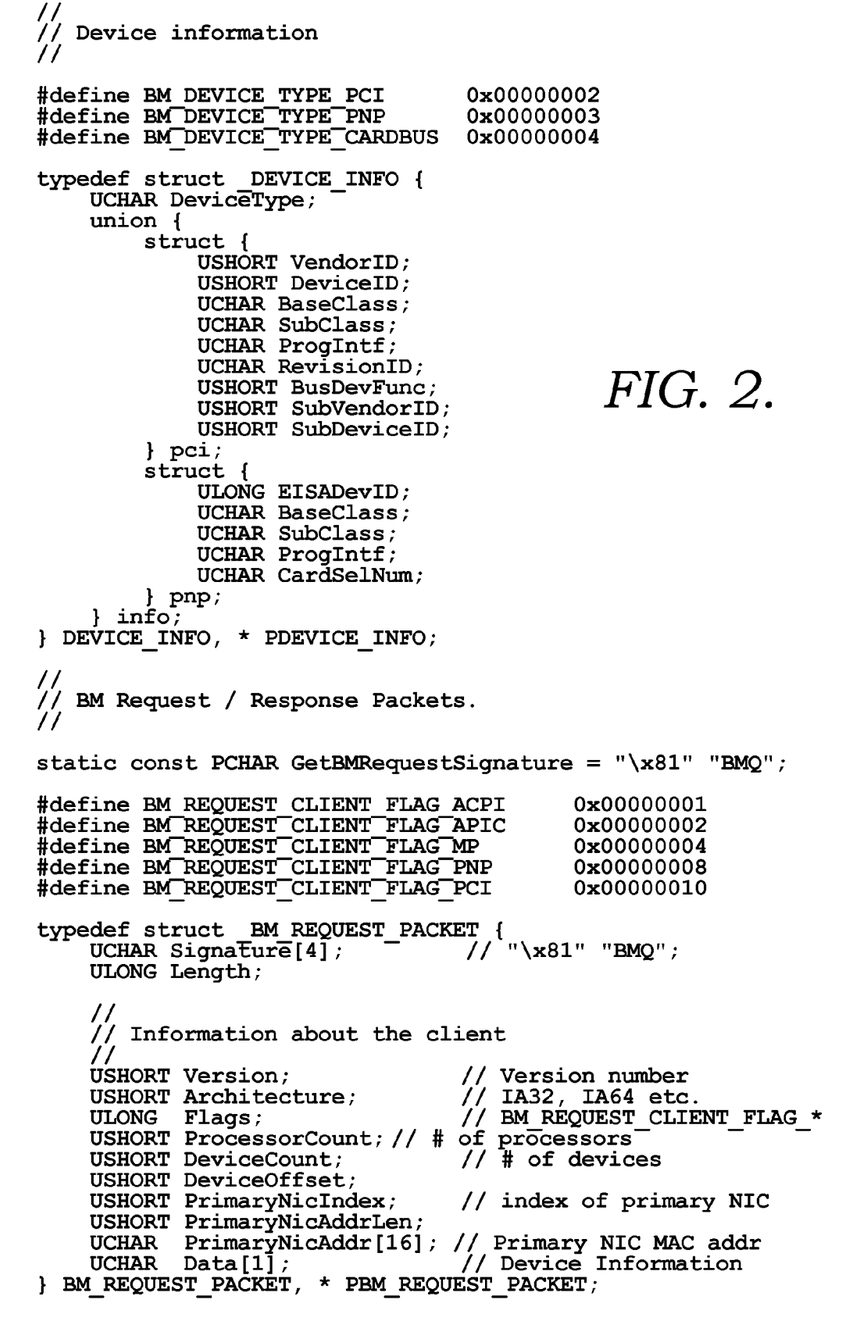
FIG. 2 illustrates a data construct for an operating system request packet, according to an embodiment of the invention.

FIG. 1 illustrates an architecture in which an embodiment of the system and method for installation of an operating system on a remote device may operate. In this environment as shown, a client 102 may communicate with a support server 112 via a communications link 110 to exchange machine-specific information to prepare the generation and transmission of a customized operating system kernel 136 to initialize or operate the client 102. The delivery and initiation of the operating system kernel 136 may in embodiments may be executed without a need for a separate setup phase.

In embodiments, the client 102 may be or include, for instance, a personal computer running the Microsoft Windows™ 95, 98, Millenium™, NT™, 2000 or XP™, Windows™CE™, MacOS™, PalmOS™, Unix, Linux, Solaris™, OS/2™, BeOS™, MacOS™, VAX VMS or other operating system or platform. Client 102 may include a processor 108, for instance a microprocessor such as an Intel x86-based or Advanced Micro Devices x86-compatible device, a Motorola 68K or PowerPC™ device, a MIPS, Hewlett-Packard Precision™, or Digital Equipment Corp. Alpha™ RISC processor, a microcontroller or other general or special purpose device operating under programmed control. Client 102 may furthermore include a basic input output system (BIOS) 104, which may for instance be stored on flashable EPROM (electronically programmable read only memory electronic memory) or other electronic or other media. Client 102 may likewise contain electronic memory 106 such as random access memory (RAM) or EPROM (electronically programmable read only memory), and other associated components connected over an electronic bus, as will be appreciated by persons skilled in the art. Client 102 may be equipped with an integral or connectable cathode ray tube (CRT), liquid crystal display (LCD), electroluminescent display, light emitting diode (LED) or other display screen, panel or device for viewing and manipulating files, data and other resources, for instance using a graphical user interface (GUI) or command line interface (CLI). Client 102 may also be or include a network-enabled appliance such as a WebTV™ unit, radio-enabled Palm™ Pilot or similar unit, a set-top box, a networkable game-playing console such as Microsoft Xbox™, Sony Playstation™, Sega Dreamcast™ or a browser-equipped or other network-enabled cellular telephone, or other TCP/IP client or other device.

In embodiments, the client 102 may for instance be a diskless machine, that is, a computer or other client which is not equipped with a hard drive or other comparatively permanent storage medium. In that configuration client 102 may lack a stored copy of a functioning operating system, or a stored copy of an installer for an operating system, so that client 102 must be initialized with a functioning operating system or kernel before productive use. In other embodiments, client 102 may contain storage such as a hard drive, CDROM or rewritable CDROM or other magnetic, optical or other media, but that media may be disabled or malfunctioning to an extent that prevents the client 102 from booting into an operating system, or continuing to operate under the control of a functioning operating system. In all cases, the client 102 may communicate with the support server 112 to receive an operating system kernel 136 which contains selected application programming interfaces (APIs), drivers, information (INF) files and other resources tailored to the installed hardware of client 102, to initiate and operate that machine.

Client 102 may for instance be powered on, detect and begin to load BIOS 104. In embodiments, the BIOS 104 may contain network-enabled code, such as the Intel Corp. Pre-Boot Execution Environment (PXE™) protocol which may automatically identify the client 102 to communications link 110, prior to or without a successfully booted operating system. This may permit client 102 to communicate with support server 112 over communications link 110, without the necessity of a loaded operating system. Client 102 may, for instance, in embodiments transmit data in the dynamic host configuration protocol (DHCP) to the support server 112. The BIOS 104 may identify the client 102 to the communications link 110, for instance, by automatically communicating a network address to the communications link 110, for example a media access control (MAC) or other address or data.

The BIOS 104 or associated code may likewise transmit a request to initiate a process to generate and download an operating system kernel 136 via communications link 110. In embodiments, the client 102 may have booted through BIOS 104 but been unable to load an operating system or other resources from a hard drive or other media, or encountered other hardware or software faults. In such cases, the client 102 may communicate a network address or other data to the communications link 110 via an operating system which traps a fault, network utility or other module or interface, to request the generation of an operating system kernel 136 for repair, maintenance or other purposes.

Figure 3:
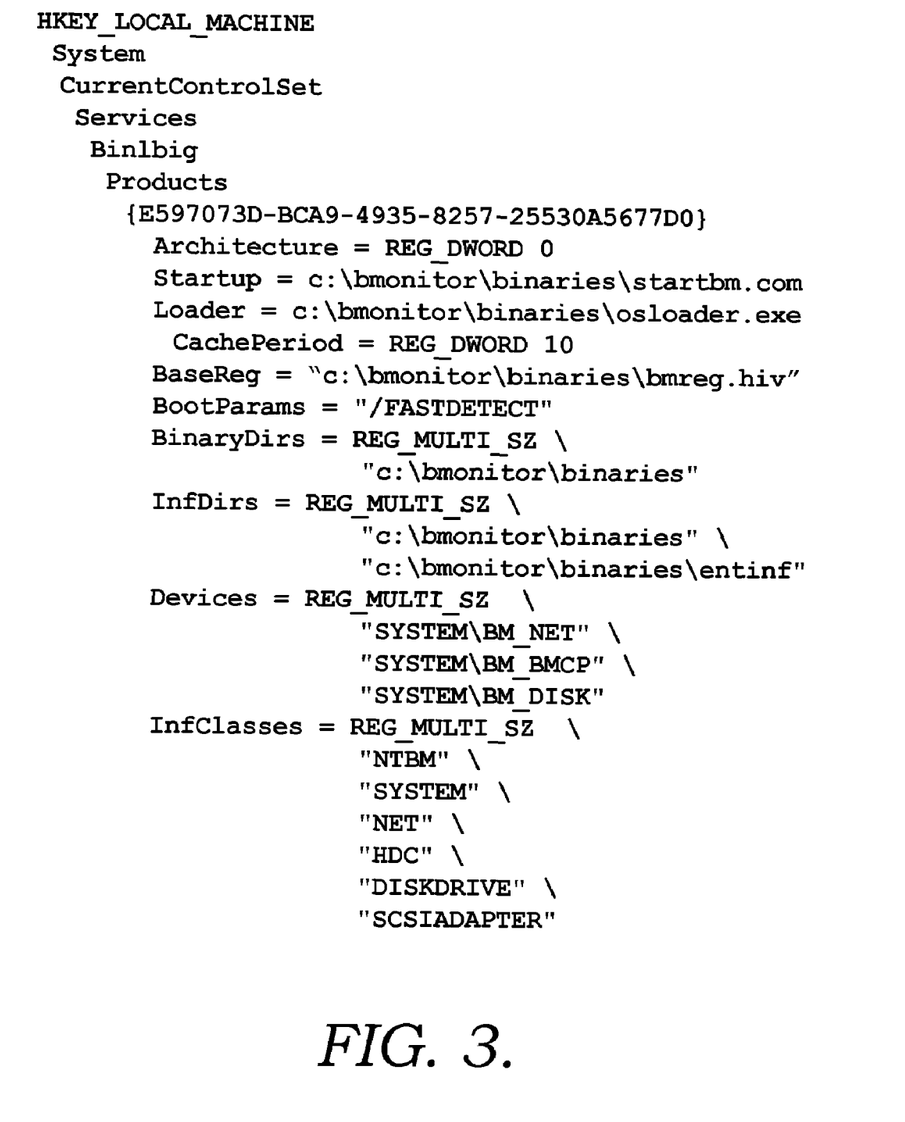
FIG. 3 illustrates a data construct for a product settings record, according to an embodiment of the invention.

Whether generated from BIOS 104 or otherwise, client 102 may transmit a request packet 132 to initiate the generation and downloading of operating system kernel 136 when needed. An exemplary data structure for request packet 132 is illustrated in FIG. 3. As shown in the figure, the request packet 132 may contain data elements representing or related to the hardware and software state of the client 102, and other information. For instance, the request packet 132 may include information regarding the hardware architecture of the client 102, indicating for instance that the processor 108 is an Intel Corp. x86™-based device, or other part. The request packet 132 may include information regarding the presence of add-in devices, such as network card, video or sounds cards or other peripherals, detected for example via a peripheral component interconnect (PCI) bus or Plug-and-Play (PnP) enumeration.

Request packet 132 may furthermore include one or more flags to alter the configuration of operating system kernel 136, as well as specific values for MAC or other addressing information. Other data fields and constructs are possible. The request packet 132 may be transmitted over communications link 10 to support server 112. Communications link 110 may be, include or interface to any one or more of, for instance, the Internet, the World Wide Web, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.92, V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Communications link 110 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth, BlueTeeth or WhiteTooth radio link, or an IEEE 802.11 (Wi-Fi)-based radio frequency link such as 802.11 a, 802.11 b, 802.11 g or other protocol. Communications link 110 may yet further be, include or interface to any one or more of an RS-232 serial connection, an IEEE-1394 (Firewire) connection, a Fibre Channel connection, an IRDA (infrared) port, a SCSI (Small Computer Systems Interface) connection, a USB (Universal Serial Bus) connection or other wired or wireless, digital or analog interface or connection.

The support server 112 may receive the request packet 132 to process an operating system kernel 136 to transmit to client 102, or take other action. In embodiments, the support server 112 may contain database, network interface and other resources to evaluate request packet 132 and respond with an appropriate operating system kernel 136. The support server 112 may be or include, for instance, a workstation running the Microsoft Windows™ NT™, Windows 2000™, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. As illustrated, the support server 112 may contain a dispatcher module 114, communicating with communications link 110 to receive and transmit TCP/IP or other data packets to client 102 or other nodes. The dispatcher module 114 may likewise communicate with builder engine 116 which may manage the construction of operating system kernel 136, and perform other tasks. Builder engine 116 may consist of one or more software modules or other routines or resources to extract appropriate components for operating system kernel 136, and perform other tasks. As illustrated, builder engine 116 may communicate with one or more storage resources, including image store 128 and product store 118. Product store 118 may contain a collection of product identifiers, software components and other resources needed to build an instance of a given requested product. For instance, in embodiments the request packet 132 may contain a request to build an instance of Microsoft Windows 2000™ operating system to install into the electronic memory 106 of client 102. In that case, the builder engine 116 may select components for an operating system kernel 136 based upon that product, such as for instance, registry files and structures, APIs, drivers, INF (information) files, other files or directory structures, utilities, program shells, user interfaces, graphical or rendering engines, or other system resources or services.

Product processor 120 may likewise interact with product store 118 to populate product store 118 with appropriate components for response to request packet 132. Product processor 120 may for instance contain an INF parser 122 to generate appropriate INF files by communicating with INF set 126 and product settings 124, which may include data or routines to specialize or tune drivers or other resources, depending on the machine configuration of client 102 or other factors.

Product settings 124 may contain data structures and other information as for example illustrated in FIG. 3. As shown in that figure, the product settings 124 may contain settings to be inserted in various keys or other sections of an operating system registry or other resource. In embodiments, individual products, such as client, workstation, cluster, enterprise or other versions or classes of an operating system such as Microsoft Windows 2000™ or other operating systems, may be identified by a GUID field or other data. In embodiments, that field may be stored under a registry key, such as "HKLM\System\CurrentControlSet\Services\Binlbig\Products", or other keys. As shown in FIG. 3, the settings for a given product identified by GUID or other fields may include settings listed under that field in a registry or other system store. The product settings 124 may include for example an architecture specifier, such as x86 or other processors or chipsets. The product settings 124 may likewise contain an indicator for a default startup module to execute, such as "startbm.com" for x86 machines or other modules or routines. Product settings 124 may also include an indicator for a loader module to load operating system kernel 136, identified by a directory path or other data. Product settings 124 may furthermore include a cache period value, to indicate the lifetime of cached images of loader or other modules, for instance as stored on disk in support server 112, to maintain currency. When used, a default of 30 minutes or other values may be applied, while a value of zero may indicate that no images are to be cached.

Product settings 124 may further include an indicator for a base system registry key to be used. Product settings may similarly include an indicator for boot parameters to apply, such as kernel boot programs to be set in a "boot.ini" or other file., for which a default may be set to "/FASTDETECT" or other values. Product settings 124 may moreover include an indicator for one or more binary directories which will contain binary images of the operating system kernel 136 or modules thereof, or other modules or resources. In embodiments, the directories may be used in the order specified in this key. If a duplicate file appears in different directories, it may be copied from the first directory in this field.

Product settings 124 may likewise include an indicator for INF directories, that is, one or more directories to contain INF files to install operating system kernel 136. Every file having an ".inf" extension may be parsed in each of the specified directories, and in embodiments it may be valid to have the same INF file appear in multiple directories and have different content. For example, one INF directory may be directed to professional stock keeping units (SKUs) reflecting a validly purchased operating system package, while another may be directed to enterprise class SKUs for that same package, and contain INF files with different values in each location, accordingly. In embodiments, the delivery of the operating system kernel 136 may be based upon a subscription service, for instance a paying or non-paying subscription for operating system or other support.

Product settings 124 may yet further contain an indicator for INF classes, identifying one or more INF class strings which may be used, for example, to filter INF files to be parsed in directories. If no INF class is specified, then all INF files may be parsed in the operating system installation process. According to the illustrated settings for this field, the BMonitor (Boot Monitor), System, Network and disk-related INF files may be parsed, and other INF classes may be omitted. Other combinations are possible.

INF set 126 itself may likewise contain one or more INF files for build purposes. The INF files may generally be configured as text files, which in one regard may describe driver files and other data related to devices and resources installed on a client machine. Builder engine 116 may select appropriate drivers and other data from INF set 126 to permit installed peripherals and other parts or resources to be appropriately recognized by an instance of operating system kernel 136 or other software.

Builder engine 116 may likewise communicate with image store 128, which may store images of previously built or modified instances of operating system kernel 136. In embodiments, the builder engine 116 may query the image store 128 after receipt of a request packet 132 to determine if an image of an operating system kernel 136 has already been built and stored for a machine matching or nearly matching the client 102. Image store 128 may contain a hardware image table 130 against which data identifying client 102 may be compared, for instance by way of a hash of hardware component data or other techniques. Builder engine 116 may retrieve an image of an operating system kernel 136 when a match is found, in order to transmit a responsive build to client 102. Likewise, if a near-match in image store 128 is found, builder engine 116 may retrieve that build and modify that image using product store 118 and other resources to match the specifications of client 102. In instances where little or no overlap exists between the hardware profile of client 102 and the versions stored in image store 128, builder engine 116 may execute a comprehensive build of operating system kernel 136 via product store 118 and other resources.

Figure 4:
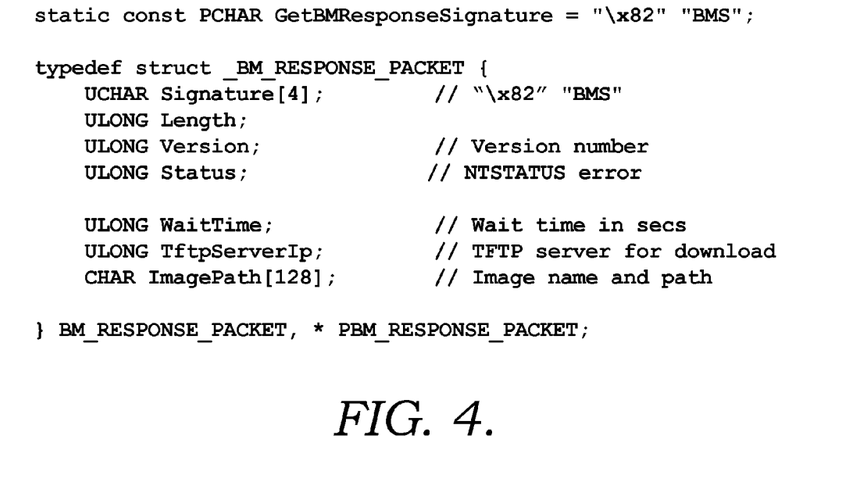
FIG. 4 illustrates a data construct for a response packet delivered to a client, according to an embodiment of the invention.

Before, during or after the build of operating system kernel 136 is complete, the builder engine 116 may communicate a response packet 134 to the client 102 via communications link 110. An exemplary data structure for response packet 134 is illustrated in FIG. 4. As shown in the figure, the response packet 134 may contain data elements representing or related to the status of the response to request packet 132, and other information. For instance, as illustrated the response packet 134 may include information regarding the success or failure of the request, in a flag format or other indicator. The response packet 134 may further contain information regarding the wait time of a pending request, for instance to indicate a period of time before another attempted request packet 132 may be transmitted.

The response packet 134 may furthermore indicate a source address to which the client 102 may go to download the operating system kernel 136, if the operating system kernel 136 is not transmitted directly from support server 112. For instance, in embodiments a remote server may be accessed using the trivial file transfer protocol (TFTP) server at a TFTP address. Other protocols or sources of the file may be used. An image file name of the operating system kernel 136 may also be contained in response packet 134, so that the operating system kernel 136 may retrieved from support server 112, a TFTP server or another server or resource. Other delivery mechanisms are possible.

Figure 5:
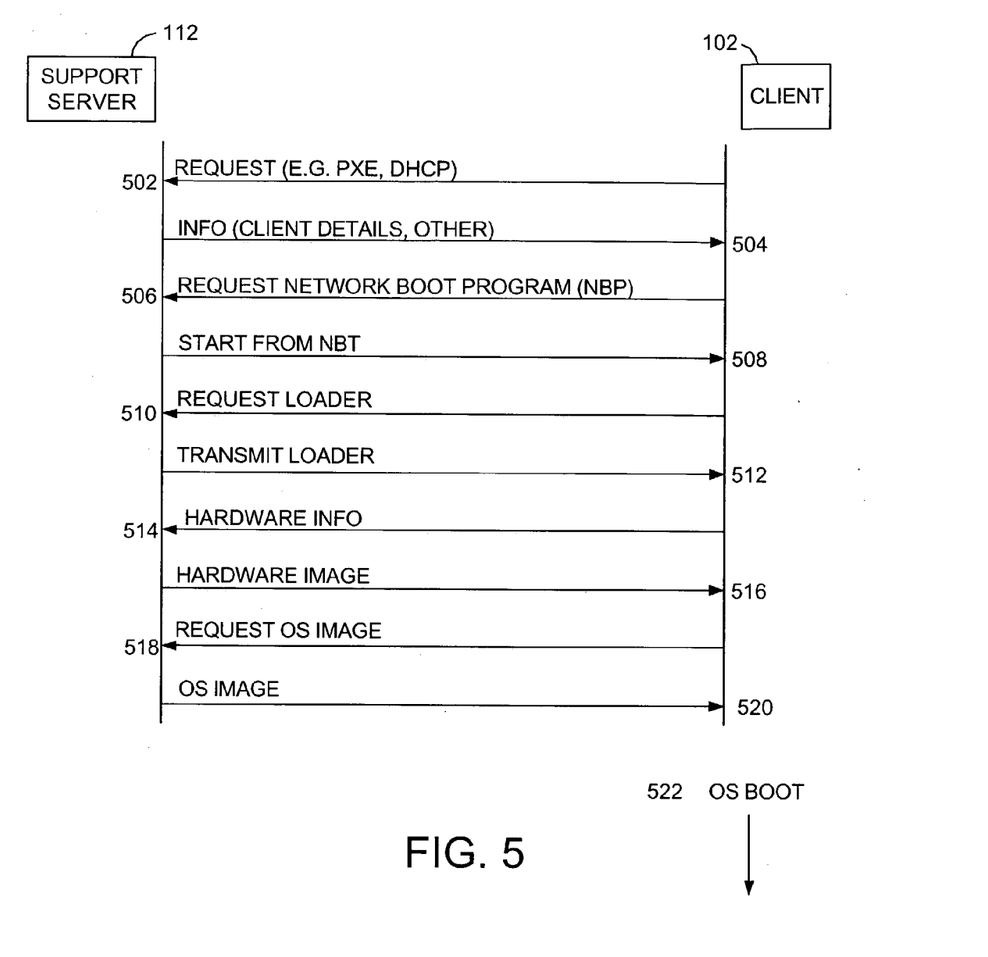
FIG. 5 illustrates a flow diagram of initialization and loading of an operating system kernel, according to an embodiment of the invention.

Upon receipt of the operating system kernel 136, the client 102 may store that kernel in electronic memory 106 to execute file, network and other system functions. For instance, under control of the operating system kernel 136 a directory structure may be built in electronic memory 106, so that data and other files may be separated, stored and worked on. In embodiments, for instance where client 102 contains functional hard drive or other storage, operating system kernel 136 may link to a network site or other resource to perform a full setup and installation of an operating system, followed by a reboot or other actions. Processing for the generation of a customized operating system according to an embodiment of the invention is illustrated in FIG. 5. In step 502, client 102 may transmit request packet 132 to the support server 112, using the PXE or other resources in BIOS 104, communicated using the DHCP or other protocol. In step 504, the support server 112 may respond with an initial data packet, for instance a TCP/IP or other packet, acknowledging the request packet and containing other data, such as confirming details about the target client 102 or other information.

In step 506, the client 102 may request a network boot program (NBP), or other "sniffer" or initialization module to facilitate further exchange of data for to generate operating system kernel 136. In step 508, the support server 112 may communicate a NBP or other compact or temporary initialization module to the client 102 via communications link 110. In step 510, the client 102 may execute an NBP or other module to request a loader module from support server 112. In step 512, the support server 112 may transmit a loader module to client 102, to facilitate receipt of operating system kernel 136. In step 514, the client 102 may communicate hardware profile information to the support server 112, for instance processor, memory, PnP, PCI enumeration and other data regarding the hardware image of the client 102.

In step 516, the support server 112 may interpret the hardware profile of the client 102 to transmit a hardware image to client 102, such as hardware abstraction layer (HAL), registry or other information for receipt and verification. In step 518, the client 102 may request an image or build or an operating system, for instance via request packet 132 or other structures. During step 518, the support server may access builder engine 116 and generate an operating system kernel 136. In step 520, the support server 112 may communicate the operating system kernel 136 to client 102. In step 522, the client 102 may perform an operating system boot based on the operating system kernel 136, for instance out of electronic memory 106. After the boot operation of step 522, the client 102 may begin such file, processing, network and other functions as may be supported in operating system kernel 136. In this an other embodiments, the invention may thus complete the installation of a customized operating system kernel 136, without prior knowledge of the particular hardware of client 102.

The foregoing description of the invention is illustrative, and modifications in configuration and implementation will occur to persons skilled in the art. For instance, while the invention has generally been described in terms of delivery of an operating system kernel 136, in embodiments a complete or more comprehensive build of an operating system may be performed, and delivered. Likewise, the builder engine 116 may in embodiments retrieve and build additional software or components, such as selected applications, along with the operating system kernel 136 or other resources.

Likewise, while the invention has generally been described in terms of the analysis of an individual client 102 to which a customized operating system kernel 136 is targeted, in embodiments the hardware receiving the operating system kernel 136 may consist of one or more machines. For instance, a LAN or other facility may contain a number of identical or near-identical machines, only one of which need exchange hardware profile or other request data to trigger the delivery of operating system kernel to multiple machines.

Similarly, while the invention has generally been described in terms of a single support server 112, in embodiments one or more servers may host and respond to various parts of a build requests, and perform other actions. The database or other stores used to house the image store 128, product store 118, product settings 124, INF files 126 and other resources may be similarly distributed. The scope of the invention is accordingly intended to be limited only by the following claims.

What is claimed is:

1. One or more computer-readable media having computer-executable instructions embodied thereon for performing a method of transmitting a customized operating system image for transmission to a remote client, comprising:
   receiving a request from the remote client to generate an operating system image, wherein the request from the remote client includes hardware profile data for the remote client;
   determining whether an operating system image that matches the hardware profile data is stored in an operating system image store;
   if an operating system that matches the hardware profiled data is found, retrieving the customized operating system image from the operating system image store;
   if an operating system that matches the hardware profiled data is not found, determining whether an operating system image that nearly matches the hardware profile data has already been built;
   if an operating system that nearly matches the hardware profile data is found, modifying the nearly matching operating system to build the customized operating system that matches the hardware profile data;
   if an operating system that nearly matches the hardware profile data is not found, building the customized operating system image from a product store that includes operating system elements; and
   transmitting the customized operating system image to the remote client.

2. The media according to claim 1, wherein the remote client is connected to a network.

3. The media according to claim 2, wherein the network comprises at least one of a local area network and the Internet.

4. The media according to claim 1, wherein the at least one product store comprises version data.

5. The media according to claim 1, wherein the customized image of the operating system comprises an operating system kernel.

6. The media according to claim 1 wherein the customized image of the operating system comprises a complete operating system.

7. The media according to claim 1, wherein the hardware profile data comprises at least one of processor information, memory information, plug and play information, and peripheral component interconnection information.

8. The media according to claim 1, wherein the remote client comprises a diskless client.

9. The media according to claim 1, wherein the remote client comprises a client in a fault state.

10. The media according to claim 1, wherein the remote client comprises at least one of a personal computer and a wireless network-enabled device.

11. A method for generating a customized operating system image for transmission to a remote client, comprising:
receiving a request from the remote client to generate an operating system image, wherein the request from the remote client comprises hardware profile data for the remote client;
determining whether an operating system image that nearly matches the hardware profile data has already been built;
if an operating system that nearly matches the hardware profile data is found, modifying the nearly matching operating system to build the customized operating system that matches the hardware profile data;
if an operating system that nearly matches the hardware profile data is not found, building the customized operating system image from a product store that includes operating system elements; and
storing the customized image of the operating system.

12. A method according to claim 11, wherein the step of receiving comprises receiving the request via a network.

13. A method according to claim 12, wherein the network comprises at least one of a local area network and the Internet.

14. A method according to claim 11, wherein the at least one product store comprises version data.

15. A method according to claim 11, further comprising communicating the customized image of the operating system to the remote client.

16. A method according to claim 15, wherein the customized image of the operating system comprises an operating system kernel.

17. A method according to claim 15, wherein the customized image of the operating system comprises a complete operating system.

18. A method according to claim 11, wherein the hardware profile data comprises at least one of processor information, memory information, plug and play information, and peripheral component interconnection information.

19. A method according to claim 11, further comprising an operating system image store, further comprising selectively retrieving the previously-built operating system image from the operating system image store based on the hardware profile data.

20. A method according to claim 11, wherein the remote client comprises a diskless client.

21. A method according to claim 11, wherein the remote client comprises a client in a fault state.

22. A method according to claim 11, wherein the remote client comprises at least one of a personal computer and a wireless network-enabled device.

23. A system for generating an operating system image for transmission to a remote client, comprising:
first interface means, for communicating with the remote client, and receiving a request from the remote client to generate an operating system image, wherein the request from the remote client includes hardware profile data for the remote client;
at least one product store means, the at least one product store means comprising operating system elements;
a determining means, for determining that an operating system image that matches the hardware profile data has not already been built and determining whether an operating system image that nearly matches the hardware profile data has already been built;
builder engine means, the builder engine means communicating with the remote client via the first interface means and with the at least one product store means, wherein if the determining means determines that an operating system that nearly matches the hardware profile data has not already been built, the builder engine means being for building a customized image of an operating system from the operating system elements based on the request from the remote client, and wherein if the determining means determines that an operating system that nearly matches the hardware profile data has already been built, the builder engine means being for modifying the operating system that nearly matches the hardware profile data to generate the customized image of an operating system; and
a transmission means for transmitting the customized image of an operating system to the remote client.

24. A system according to claim 23, wherein the first interface means comprises a network.

25. A system according to claim 23, wherein the hardware profile data comprises at least one of processor information, memory information, plug and play information, and peripheral component interconnection information.

26. A system according to claim 23, further comprising operating system image store means, wherein the builder engine means selectively retrieves the previously-built operating system image from the operating system image store means based on the hardware profile data.

27. A system according to claim 23, wherein the remote client comprises a diskless client.

28. A system according to claim 23, wherein the remote client comprises a client in a fault state.

29. A system according to claim 23, wherein the remote client comprises at least one of a personal computer and a wireless network-enabled device.

30. One or more computer-readable media having computer-executable instructions embodied thereon for performing a method for generating a customized operating system image for transmission to a remote client, the method comprising:
receiving a request from the remote client to generate an operating system image, wherein the request from the remote client comprises hardware profile data for the remote client;
determining whether an operating system image that nearly matches the hardware profile data has net already been built;
if a nearly matching operating system has already been built, modifying the nearly matching operating system to build the customized operating system that matches the hardware profile data;
if a nearly matching operating system has not already been built. building the customized operating system image from a product store that includes operating system elements; and storing the customized operating system image in association with the hardware profile data.

31. One or more computer-readable media according to claim 30, wherein the request from the remote client is received via a network.

32. One or more computer-readable media according to claim 30, wherein the hardware profile data comprises at least one of processor information, memory information, plug and play information, and peripheral component interconnection information.

33. One or more computer-readable media according to claim 30, wherein the building comprises selectively retrieving the previously-built operating system image from an operating system image store based on the hardware profile data.

34. One or more computer-readable media according to claim 30, wherein the remote client comprises a diskless client.

35. One or more computer-readable media according to claim 30, wherein the remote client comprises a client in a fault state.

36. One or more computer-readable media according to claim 30, wherein the remote client comprises at least one of a personal computer and a wireless network-enabled device.

37. A computerized method for generating a customized operating system image, the method comprising:
  receiving a request from a remote client to generate an operating system image, wherein the request from the remote client comprises hardware profile data for the remote client:
  if an operating system that matches the hardware profiled data is found, retrieving the customized operating system image from an operating system image store;
  if an operating system that matches the hardware profiled data is not found, determining whether an operating system image that nearly matches the hardware profile data has already been built;
  if an operating system that nearly matches the hardware profile data is found, modifying the nearly matching operating system to build the customized operating system that matches the hardware profile data;
  if an operating system that nearly matches the hardware profile data is not found, building the customized operating system image from a product store that includes operating system elements; and
  storing the customized operating system.

38. The computerized method according to claim 37, wherein the request from the remote client is received via a network.

39. The computerized method according to claim 37, wherein the hardware profile data comprises at least one of processor information, memory information, plug and play information, and peripheral component interconnection information.

40. The computerized method according to claim 37, wherein the remote client comprises a diskless client.

41. The computerized method according to claim 37, wherein the remote client comprises a client in a fault state.

42. The computerized method according to claim 37, wherein the remote client comprises at least one of a personal computer and a wireless network-enabled device.

43. A client for receiving an operating system image, comprising:
  the client, the client generating a request for the generation of a customized operating system image, wherein the request from the client includes hardware profile data used for the client; and
  a first interface to a support server, the support server having a builder engine, the builder engine communicating with the client via the first interface to transmit a customized operating system image to the client, wherein if an operating system that matches the hardware profiled data is found, a matching customized operating system image is transmitted, if an operating system that matches the hardware profile is not found and an operating system that nearly matches the hardware profile data is found, the nearly matching operating system is modified to build the customized operating system image that matches the hardware profile data and a modified customized operating system image is transmitted, and if an operating system that matches the hardware profile is not found and an operating system that nearly matches the hardware profile data is not found, the customized operating system image is built from a product store that includes operating system elements and a newly built customized operating system image is transmitted.

44. A client according to claim 43, wherein the first interface comprises a network.

45. A client according to claim 44, wherein the network comprises at least one of a local area network and the Internet.

46. A client according to claim 43, wherein the client generates the request using at least BIOS code.

47. A client according to claim 43, wherein the client generates the request using at least an operating system resource.

48. A client according to claim 43, wherein the at least one product store comprises version data.

49. A client according to claim 43, wherein the customized image of the operating system comprises an operating system kernel.

50. A client according to claim 43, wherein the customized image of the operating system comprises a complete operating system.

51. A client according to claim 43, wherein the hardware profile data comprises at least one of processor information, memory information, plug and play information, and peripheral component interconnection information.

52. A client according to claim 43, wherein the client comprises a diskless client.

53. A client according to claim 43, wherein the client comprises a client in a fault state.

54. A client according to claim 43, wherein the client comprises at least one of a personal computer and a wireless network-enabled device.

55. A method for receiving an operating system image on a remote client, comprising:
  generating a request in a remote client for the generation of a customized operating system image, wherein the request from the remote client comprises hardware profile data for the remote client;
  communicating the request to a support server via a first interface, the support server having at least one product store, the at least one product store comprising operating system elements;
  if an operating system that matches the hardware profiled data is found, receiving from the support server the customized operating system image from an operating system image store;
  if an operating system that matches the hardware profile is not found and an operating system that nearly matches the hardware profile data is found, receiving a modified customized operating system that matches the hardware profile data, wherein the modified customized operating system is generated by the support server by modifying the operating system that nearly matches the hardware profile; and if an operating system that matches the hardware profile is not found and an operating system that nearly matches the hardware profile data is not found, receiving a newly built customized operating system image, wherein the newly built customized operating system is built by the support server from the at least one product store that includes operating system elements.

56. A method according to claim 55, wherein the first interface comprises a network.

57. A method according to claim 56, wherein the network comprises at least one of a local area network and the Internet.

58. A method according to claim 55, wherein the remote client generates the request using at least BIOS code.

59. A method according to claim 55, wherein the remote client generates the request using at least an operating system resource.

60. A method according to claim 55, wherein the at least one product store comprises version data.

61. A method according to claim 55, wherein the customized image of the operating system comprises an operating system kernel.

62. A method according to claim 55, wherein the customized image of the operating system comprises a complete operating system.

63. A method according to claim 55, wherein the hardware profile data comprises at least one of processor information, memory information, plug and play information, and peripheral component interconnection information.

64. A method according to claim 55, wherein the remote client comprises a diskless client.

65. A method according to claim 55, wherein the remote client comprises a client in a fault state.

66. A method according to claim 55, wherein the remote client comprises at least one of a personal computer and a wireless network-enabled device.

* * * * *